United States Patent [19]

Puglise

[11] 4,235,479
[45] Nov. 25, 1980

[54] CRAWLER VEHICLE WITH DIRT REMOVING PLATE

[76] Inventor: Angelo Puglise, Rte. 2, #6 W. Levert Dr., Luling, La. 70070

[21] Appl. No.: 67,108

[22] Filed: Aug. 16, 1979

[51] Int. Cl.³ .............................................. B62D 55/00
[52] U.S. Cl. ........................................ 305/12; 305/60
[58] Field of Search ..................... 198/494; 180/9.2 R; 280/158 R, 158 A; 305/11, 12, 13, 60

[56] References Cited

U.S. PATENT DOCUMENTS

| | | | |
|---|---|---|---|
| 2,560,307 | 7/1951 | Slemmons | 305/12 |
| 2,637,603 | 5/1953 | Cartlidge | 305/12 |
| 2,780,500 | 2/1957 | Lawson | 305/12 |
| 3,236,568 | 2/1966 | Bombardier et al. | 305/12 |
| 4,198,103 | 4/1980 | Ward et al. | 305/12 |

FOREIGN PATENT DOCUMENTS

1030252 5/1958 Fed. Rep. of Germany .......... 198/494

*Primary Examiner*—David A. Scherbel
*Attorney, Agent, or Firm*—Mason, Fenwick & Lawrence

[57] ABSTRACT

A crawler type vehicle has a frame and front idler and rear sprockets over which a crawler track extends in an upper flight and a lower flight with a pair of pusher plates being mounted on hydraulic cylinders beneath and closely adjacent said track upper flight for transverse movement from a retracted position to an extended position for kicking accumulated dirt or the like from beneath the upper flight.

7 Claims, 3 Drawing Figures

U.S. Patent    Nov. 25, 1980    4,235,479
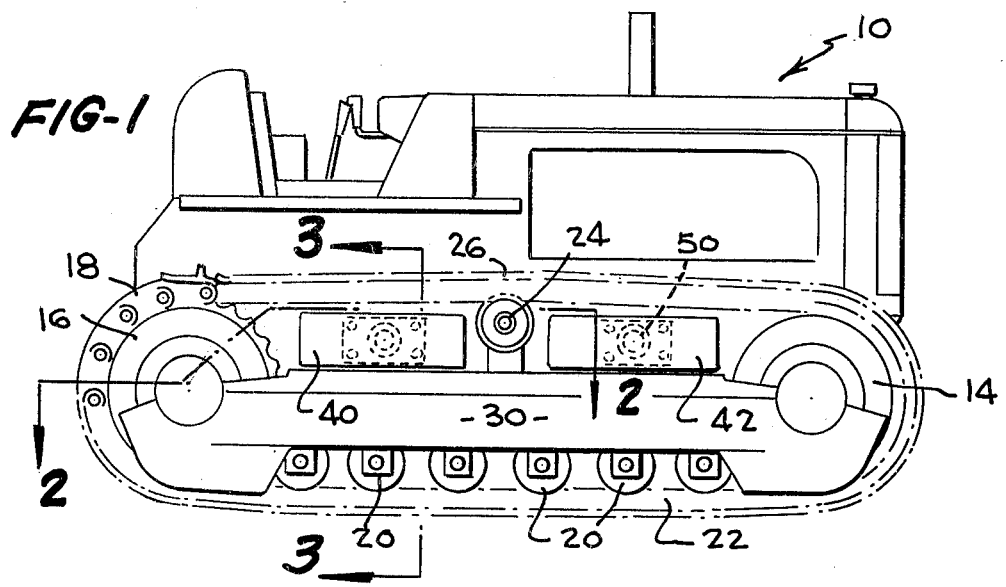
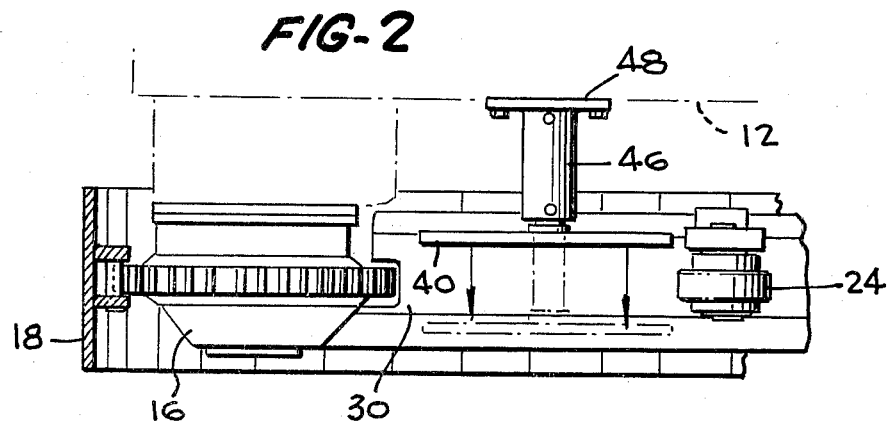
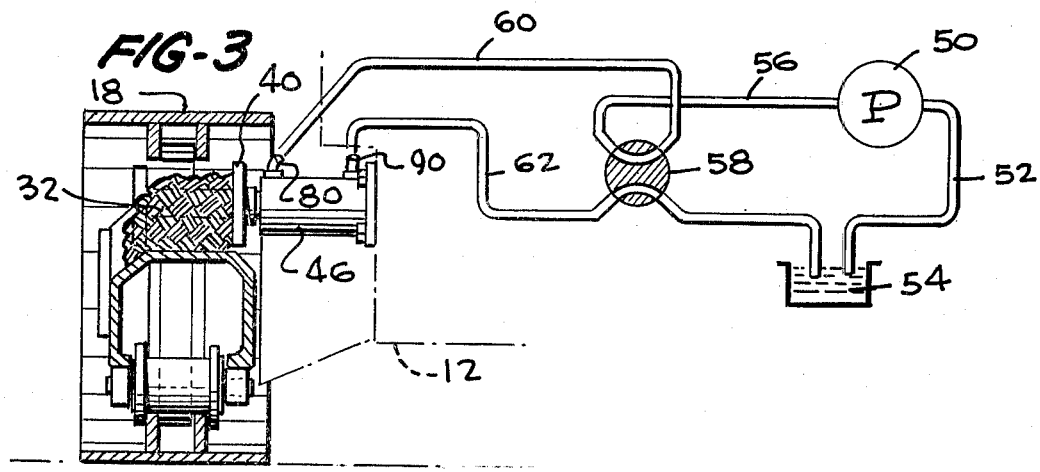

CRAWLER VEHICLE WITH DIRT REMOVING PLATE

BACKGROUND OF THE INVENTION

The present invention is in the field of crawler type tracked vehicles and is more particularly directed to means for removing dirt, mud and debris from the frame and supporting elements of the crawler track of such vehicles.

A long-standing problem involved in the operation of crawler type tractors and the like is that dirt, stones and other debris tends to accumulate on the supporting framework of the tracks of such vehicles to cause wear, breakage and malfunctioning of the crawler units so as to necessitate frequent repair at substantial expense and inconvenience. Numerous devices such as exemplified in U.S. Pat. Nos. 607,014; 2,560,307; 2,637,603 and 3,374,036 have been proposed in the past for alleviating the foregoing problems. Unfortunately, many of the prior approaches have not been fully satisfactory in that they themselves tend to quickly wear out or become inoperative for a variety of reasons. Additionally, some of the prior art devices are relatively complicated so as to be substantially expensive to fabricate and maintain. Consequently, the problem of damage and wear from dirt, stones, debris and the like accumulating on the tracks of crawler vehicles has remained unsolved and continues to represent a high cost maintenance item in vehicles of this type.

Thus, it is the primary object of this invention to provide a new and improved track cleaning means for a crawler-type vehicle.

Achievement of the foregoing object is enabled by the preferred embodiment of the invention which comprises the provision of a plurality of hydraulic cylinder members attached to the main frame of a crawler type tractor and having their rod end facing outwardly with a pusher plate being mounted on the outer end of each rod of each cylinder. Operation of the cylinder serves to move the pusher plate outwardly beneath the upper flight of the track of the vehicle to kick accumulated dirt, mud and debris from the frame unit supporting the track so as to clear such material from the track area so that it cannot damage or cause wear to the track. Control for the hydraulic cylinder members is provided by a motor driven hydraulic pump through a control valve so that the dirt, mud and trash removal can be effected by the operator at any desired time.

A better understanding of the manner in which the preferred embodiment achieves the object of the invention will be enabled when the following detailed description is considered in conjunction with the appended drawings.

DESCRIPTION OF THE DRAWINGS

FIG. 1 is a side elevation view of a crawler type tractor including the preferred embodiment of the subject invention;

FIG. 2 is a sectional view taken along lines 2—2 of FIG. 1; and

FIG. 3 is a sectional view taken along lines 3—3 of FIG. 1 and including schematic hydraulic control means.

DESCRIPTION OF THE PREFERRED EMBODIMENT

Attention is initially invited to FIG. 1 of the drawings which illustrates a crawler type vehicle of conventional design which is shown for purposes of example in the form of a tractor 10. Tractor 10 includes a main frame 12 from which axles supporting a front idler 14 and a rear sprocket 16 extend. A closed loop track 18 is supported on the front idler and rear sprockets 14 and 16 respectively with a plurality of lower idler rollers 20 being mounted on the frame of the vehicle to engage a lower flight 22 of the track 18; an upper idler roller 24 engages the center of the lower surface of an upper flight 26 of the track 18.

It will be observed that a hollow guard-frame member 30 extends above the lower idler rollers 20 between the front idler and rear sprockets. Normally, mud, trash, dirt and the like tends tends to accumulate as shown at 32 in FIG. 3 on the upper surface of the guard-frame unit 30. The present invention is directed toward apparatus for preventing such an accumulation of the mud-dirt and the like which, if permitted to go unchecked, can create excessive wear and/or damage to the track and its supporting and drive means.

More specifically, first and second pusher plates 40 and 42 are respectively mounted on opposite sides of the idler roller 24 for movement between a retracted position illustrated by the solid line position of plate 40 in FIG. 2 and the phantom line position of the same figure. It should be observed that the second pusher plate 42 is mounted in exactly the same manner as the first pusher plate and that the mounting means is not shown in the drawings. Pusher plate 40 is supported on the rod 44 of a hydraulic cylinder and piston assembly including a cylinder 46 attached by bracket means 48 to the frame 12 of the vehicle 10. An identical cylinder 50 and bracket means is provided for supporting the second pusher plate 42 in exactly the same manner as the first pusher plate 40.

In operation, a motor driven pump 50 illustrated in FIG. 3 operates to receive hydraulic fluid via a conduit 52 extending from a sump 54. The output line 56 of the pump 50 is connected to a variably movable valve 58 so that the pressurized fluid from line 56 can be directed by conduits 60 or 62 to either the head end or the rod end of the cylinders 46 and 50. When the pressure is directed to the head end of the cylinders, the pistons are extended to move the pusher plates 40 and 42 from the retracted solid line position of plate 40 in FIG. 2 to the phantom line position to expel the accumulation 32 of mud-trash-dirt and the like outwardly away from the track in an obvious manner. The cylinder assembly 50 on which the second pusher plate 42 is mounted is actuated simultaneously with cylinder 46 by means of conduits 80 and 90 connected to conduits 60 and 62 as shown in FIG. 3.

Thus, it will be seen that the present invention provides a uniquely simple, rugged and reliable means for effecting the cleaning of the tracks of a crawler type vehicle. While numerous modifications of the preferred embodiment will undoubtedly occur to those of skill in the art, it should be understood that the spirit and scope of the invention is to be limited solely by the appended claims.

I claim:

1. A crawler type vehicle of the type having a frame and front idler and rear sprockets over which a crawler track extends in an upper flight and a lower flight, the improvement comprising pusher plate means mounted beneath but closely adjacent said track upper flight for transverse movement with respect to the vehicle between a retracted position and an extended position and power actuator means mounted on said frame for moving said pusher plate means from said retracted position to said extended position to expel accumulated dirt or the like from beneath the upper flight and for returning the pusher plate to its retracted position.

2. The invention of claim 1 wherein said power actuator means comprises a hydraulic cylinder, a piston mounted in the cylinder and having a piston rod extending outwardly therefrom, said cylinder being mounted on the tractor frame and said pusher plate being mounted on said piston rod.

3. The invention of claim 1 wherein said crawler type vehicle includes an upper idler roller supportingly engaging the upper flight of said track and said power actuator means comprises first and second hydraulic cylinder assemblies respectively positioned on opposite sides of said upper idler roller and each of said hydraulic cylinder assemblies comprising a hydraulic cylinder, a piston mounted in the hydraulic cylinder and having a piston rod extending outwardly therefrom, said cylinder being mounted on the tractor frame and said pusher plate means comprising first and second pusher plates respectively mounted on the piston rods of the first and second hydraulic cylinder assemblies.

4. The invention of claim 1 wherein said power actuator means comprises a hydraulic cylinder, a piston mounted in the cylinder and having a piston rod extending outwardly therefrom, said cylinder being mounted on the tractor frame and said pusher plate being mounted on said piston rod and further including selectively operable valve means connected to a source of pressurized fluid for actuating said hydraulic cylinder and piston.

5. The invention of claim 4 wherein said crawler type vehicle includes an upper idler roller supportingly engaging the upper flight of said track and said power actuator means comprises first and second hydraulic cylinder assemblies respectively positioned on opposite sides of said upper idler roller and each of said hydraulic cylinder assemblies comprising a hydraulic cylinder, a piston mounted in the hydraulic cylinder and having a piston rod extending outwardly therefrom, said cylinder being mounted on the tractor frame and said pusher plate means comprising first and second pusher plates respectively mounted on the piston rod of the first and second hydraulic cylinder assemblies and further including a single selective valve means for simultaneously controlling said first and second hydraulic cylinders by the provision of pressurized fluid thereto.

6. The invention of claim 1 wherein said power actuator means comprises a hydraulic cylinder, bracket means connecting said hydraulic cylinder to said frame means, a piston mounted in the cylinder and having a piston rod extending outwardly therefrom, said cylinder being mounted on the tractor frame and said pusher plate being mounted on said piston rod.

7. The invention of claim 1 wherein said crawler type vehicle includes an upper idler roller supportingly engaging the upper flight of said track and said power actuator means comprises first and second hydraulic cylinder assemblies respectively positioned on opposite sides of said upper idler roller and each of said hydraulic cylinder assemblies comprising a hydraulic cylinder, a piston mounted in the hydraulic cylinder and having a piston rod extending outwardly therefrom, connector means attaching said cylinder to the tractor frame and said pusher plate means comprising first and second rectangular pusher plates respectively mounted on the piston rods of the first and second hydraulic cylinder assemblies.

* * * * *